(12) United States Patent
Dietsch et al.

(10) Patent No.: US 7,298,822 B2
(45) Date of Patent: Nov. 20, 2007

(54) X-RAY OPTICAL ELEMENT

(75) Inventors: Reiner Dietsch, Dresden (DE); Thomas Holz, Dresden (DE)

(73) Assignee: AXO Dresden GmbH, Heidenau (DE)

(*) Notice: Subject to any disclaimer, the term of this patent is extended or adjusted under 35 U.S.C. 154(b) by 0 days.

(21) Appl. No.: 11/491,462

(22) Filed: Jul. 21, 2006

(65) Prior Publication Data

US 2007/0121785 A1   May 31, 2007

(30) Foreign Application Priority Data

Nov. 25, 2005   (DE) .................... 10 2005 057 700

(51) Int. Cl.
*G21K 1/02* (2006.01)
(52) U.S. Cl. ........................................ 378/84; 378/145
(58) Field of Classification Search ............ 378/84–85, 378/145, 147
See application file for complete search history.

(56) References Cited

U.S. PATENT DOCUMENTS

| 6,249,566 | B1 * | 6/2001 | Hayashi et al. ............... 378/85 |
| 6,377,655 | B1 * | 4/2002 | Murakami et al. ........... 378/84 |
| 2006/0018429 | A1 * | 1/2006 | Hoghoj et al. ................ 378/84 |

\* cited by examiner

*Primary Examiner*—Hoon Song
(74) *Attorney, Agent, or Firm*—Fay Kaplun & Marcin, LLP.

(57) ABSTRACT

An X-ray optical element for and influencing of X-ray beam characteristics in two dimensions includes two reflective, curved elements arranged side-by-side to receive X-ray radiation from an X-ray beam source so that the radiation is directed onto both reflective elements and then reflected from one element onto the other element, wherein the two reflective elements are curved at different angles and have different focal lengths.

10 Claims, 2 Drawing Sheets

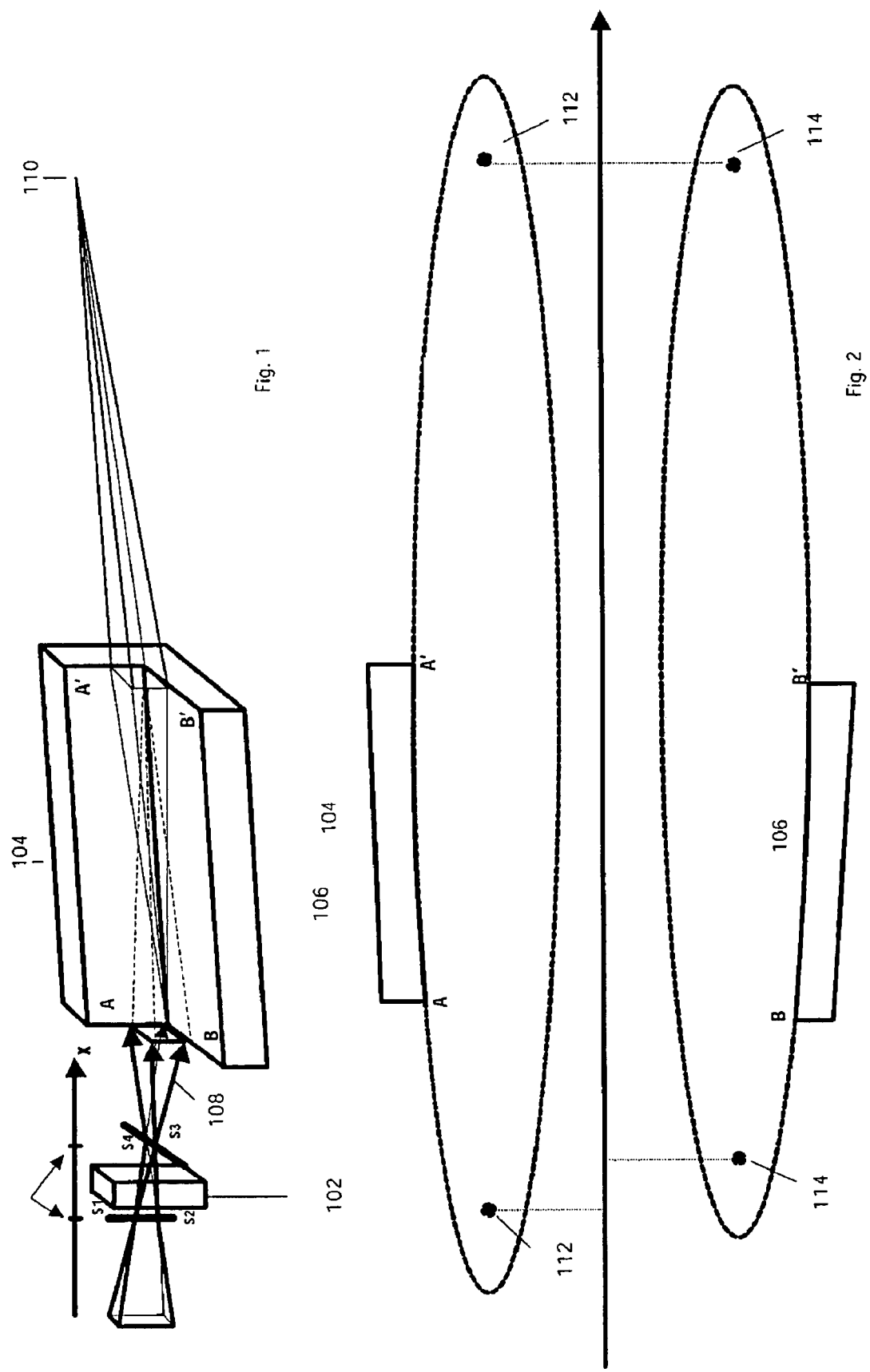

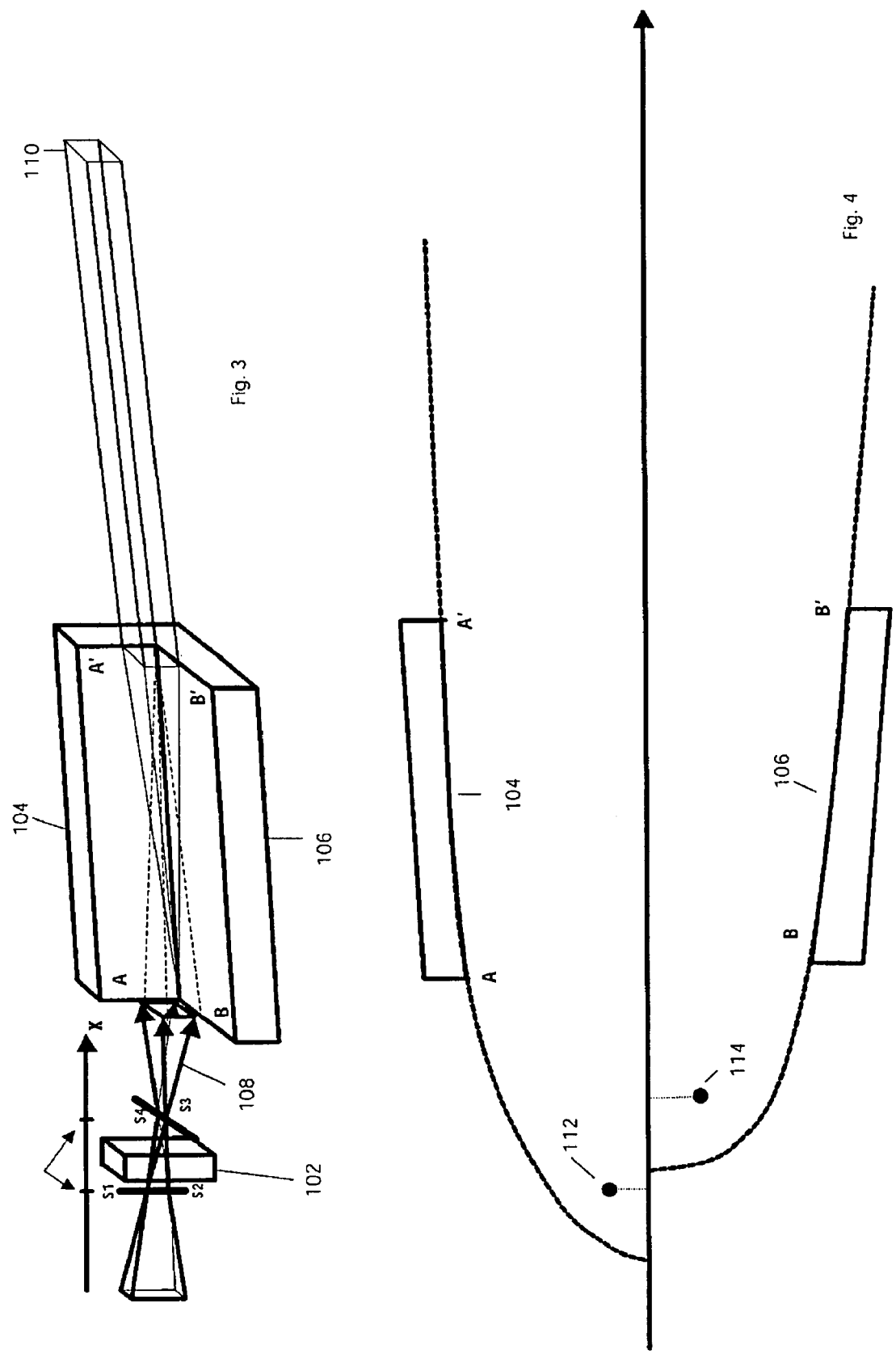

X-RAY OPTICAL ELEMENT

This application claims the benefit of German Patent Application Ser. No. DE 10 2005 057 700.8 filed on Nov. 25, 2005. The specification of this application is expressly incorporated by reference into this application in its entirety.

The invention relates to X-ray optical elements which are generally provided with gradient multilayer mirrors. This involves an improved form of a side-by-side arrangement according to Montel. Such X-ray optics are able to collimate or focus the radiation from an X-ray beam source in both spatial directions and are usually used in conjunction with spatially resolving area counters (2D detectors) in X-ray diffractometry or small-angle scattering or for local excitation of fluorescent radiation in X-ray fluorescence analysis.

The principle of side-by-side or arrangement according to Montel of two curved mirrors was described back in 1960 by Cosslett and Nixon; "X-Ray Microscopy"; Cambridge at the University Press; 1960, and in this form as an example also in DE 699 09 599 T2. Montel optics are distinguished by a high photon flux on the sample, a compact external form, virtually identical beam properties in the spatial directions perpendicular to the beam direction and easier handleability and adjustability compared with the arrangement—likewise cited by Cosslett and Nixon—of X-ray mirrors in Kirkpatrick-Baez geometry (KB arrangement).

Instead of lying one behind another (KB arrangement), the two beam-shaping X-ray mirrors (elementary mirrors) in the Montel arrangement lie side-by-side and image the X-ray source. Each elementary mirror of the side-by-side arrangement or the KS arrangement has a cylindrically symmetrical surface contour, that is to say that said mirrors are embodied as a plane parabola (collimating or parallel beam optic) or plane ellipse (focussing optic). Two-dimensional beam shaping requires reflection at both elementary mirrors, which therefore means a total of two reflections (that is to say that the transmission of the optic is proportional to $R^2$ if R denotes the reflectance of an elementary mirror).

In the side-by-side optic according to Montel, the elementary mirrors are joined together at a right angle (90°) in order to ensure the exact imaging of the X-ray source, which is described both in Cosslett and Nixon and in DE 69909599 T2 (cf., in particular, Patent claim 1).

The optimally adjusted mirrors in the KB arrangement also lie at right angles with respect to one another one behind another.

In these two known arrangements, meridional and sagittal focal points of the optics coincide at a point in the beam direction.

Both Cosslett and Nixon, and U. W. Arndt; "Focusing Optics for Laboratory Sources in X-ray Cristallography"; J. Appl. Cryst.; (1990) 23; pp. 161-168, describe the possibility of two-dimensional beam shaping with only one reflection at a paraboloidal or ellipsoidal surface that is simultaneously curved meridionally and sagittally. The advantage of this solution consists in the higher transmission—higher by the magnitude 1/R (R instead of $R^2$)—of the optical element compared with the side-by-side arrangement according to Kirkpatrick-Baez, since the second reflection does not take place. It may be disadvantageous that the suppression of disturbing parts of the emission spectrum of the X-ray source likewise takes place only with R rather than with $R^2$.

When rotational symmetry is present, the meridional and sagittal focal points likewise coincide in the beam direction.

The brilliance of the X-ray beam source is also significant in this case. It is all the higher, the higher the thermal power introduced on the anode.

U. W. Arndt explains, inter alia, that there is a relationship between the form of the thermal tube focus and the thermal power introduced on the focal spot of the X-ray source. If x and y were the dimensions of the thermal focal spot on a Cu anode, a maximum thermal power of 460 W/mm would result given y/x=1 (the length indication relates to the lateral lengths of a quadrangle containing the area x*y=A), where an increase to 630 W/mm may be observed given a ratio where y/x=10.

Owing to this fact, the laboratory X-ray tubes used nowadays have thermal focal spots which achieve a ratio y/x>10 (e.g. 8 mm/0.4 mm) and thus naturally a higher brilliance than is the case with comparable X-ray beam sources having a square thermal focal spot.

If a thermal focal spot of an X-ray beam source is considered at the take-off angle α, there appears either in the y direction what is usually referred to as an optical point focal spot having the extent [x, z=y*sin(α)] or in the x direction a line focal spot having the extent [z=x*sin(α), y] (e.g. line 0.04 mm*8 mm, point 0.4 mm*0.8 mm).

The geometric focal spots thus represent a projection of the thermal focal spot of the X-ray beam source into a geometric plane. Even if the projection supplies a square and hence symmetrical focal spot, the X-ray radiation nevertheless arises in the thermal focal spot which has a spatial extent in the beam direction, and it is thus advantageous for the imaging properties of an optic to take account of this particular feature of the arising of radiation.

In the case of a line focal spot, the extent in the beam direction is negligibly small with respect to the acceptance of an elementary mirror at 0.4 mm or 0.04 mm, but it is very considerable in the case of point focal spots (8 mm to 0.8 mm).

There is a discrepancy between the geometric focal point (optic focus) of elementary mirrors arranged side by side in the plane perpendicular to the beam direction and the real and non-symmetrical thermal focal point in the plane of the anode surface of the X-ray beam source, which on top of everything is inclined in relation to the plane perpendicular to the beam direction by the take-off angle 90°-α.

It is not necessarily so that the identical elementary mirrors in side-by-side arrangement also have to generate a symmetrical beam cross section in the imaging of the thermal focal spot (square or circle) if the real X-ray tube focal point has different extents in the x and y directions. Rather, it is to be expected that a rectangular focal spot present in reality is also imaged into a rectangular focal point or an elliptical focal spot is again imaged into an ellipse.

If the meridional and sagittal focal points coincide, then the geometric focal point (optic focus) of the X-ray optic does not, moreover, lie on the entire thermal focal spot, but rather only on a small segment thereof. The situation where locations having different levels of thermal loading and hence different brilliance are situated locally on the thermal focal spot cannot be precluded. If specific influences shift the position of the thermal focal spot on the anode relative to the geometric focal point of the optic, intensity fluctuations at the location of the sample may be the consequence.

Accrrding to the invention, this object is achieved by means of X-ray optical elements. Advantageous refinements and developments can also be achieved.

Therefore, in many points the solution according to the invention is constructed analogously to that known from DE 699 09 599 T2. In this case, the X-ray optical element according to the invention is formed anaolgously to the arrangement described by Moontel likewise with two elements such as elements 104, 106 of FIGS. 1-4 that reflect the X-ray radiation 108 of FIGS. 1, 3 and are arranged side-by-side. The reflect the surfaces 104, 106 of FIGS. 1-4 are curved in this case. This may be parabolic as shown in FIG. 4 or elliptical as shown in FIG. 2. However, it is also possible to form a combination of parabolic and elliltical curvanture at a respective one of the reflective elements.

In this case, an X-ray beam emitted 108 by an X-ray beam souce 102 of FIGS. 1 and 3 is directed onto the two reflective elements 104, 106 that are arrangee side-by-side and preferbly connected to one another and is reflected in one axis by one reflective element and in a second axis by the other element. The X-ray beam source 102 may be between a line formed from points S1 and S2 and a line formed between S3 and S4. The line S1-S2 may be a substantially vertical line where the X-ray intersect prior to reflecting off the elements 104, 106. The line S3-S4 may be substantially perpendicular line to the line S1-S2 where the X-rays intersect prior to reflecting off the elements 104, 106. It should be noted that the line S1-S2 being disposed before the line S3-S4 is only exemplary an the line S3-S4 may be disposed prior to the line S1-S2. The Disposition of the X-ray beam source 102 may allow the X-rays from the souce 102 to form a tetraeder. Those skilled in the art wiil understand that the disposition of the reflective elements 104, 106 and an appropriate location of the X-ray beam source 102 allows the tetraeder to form according to the present invention. An improved astigmatic configuration of the X-ray arrangement according to the present invention may be had. Furthermore, the elongation of the X-ray radiation may be improved. With regard to the reflection, if the Xray beam 108 initially reflects off element 104, then the X-ray beam is subsequently reflected off element 106. The portion of the X-ray radiation that is reflected by the two reflective elements impinges on a further area—downstream in the beam path—of the respective other reflective element and is reflected there a second time, in this case in the other axis.

In this case, the angles of curvature of the two reflective elements 104, 106 deviate from one another, so that they have a different focal length. For xample, in FIG. 2, element 104, 106 exhibit elliptical curvatures where foci 112 and 114, respectively, are situated in a different location. In another example, in FIG. 4, elements 104, 106 exhibit parabolic curvatures where foci 112 and 114, respectively, are situated in a different location. That is, the focal length for foci 112, 114 are different. This angular deviation may be keep small and lie within the range of 0.01 to a few tenths of a degree. Those skilled in the art will understand that with an elliptical curvature, the resulting reflections cause a convergence of the X-ray beam 108 such as end point 110 in FIG. 1. Thosr skilled in the art wiil also understand that with a parabolic curvature, the resulting reflections cause a divergence of the X-ray beam 108 such as end point 110 in FIG. 3.

The targeted use of a "spatial dissociation" of the meridional and sagittal focal points affords better success in removing the abovementioned discrepancy and minimizing intensity fluctuations resulting from positional fluctuations of the thermal focal spot of X-ray beam sources.

The use of different reflective elements makes it possible, in the case of focussing side-by-side arrangements, to influence the imaging ratio in the x and y directions in such a way that approximately a square or a circular beam cross section of the X-ray beam reflected by the two reflective elements and a corresponding focal spot geometry are formed at the sample location.

The X-ray radiation reflected by the two reflective elements can be locally influenced with regard to one or more characteristics, and this can be achieved in two dimensions. After the reflection of the X-ray radiation, the latter is influenced by way of its cross section, and this can also be exploited at the imaging location, for example at a sample.

Thus, the following characteristics of the X-ray radiation reflected according to the invention can be influenced: homogeneity, photon density distribution over the cross section of the reflected X-ray beam. Its cross-sectional form and the size of the cross-sectional area. The divergence can also be influenced.

With the use of astigmatism, the source-side focal point of X-ray optical systems changes into a focal point volume that is extended in the beam direction and that better integrates the real thermal focal spot into the optical imaging.

In the case of collimating optics, it is possible, by way of the targeted influencing of the parabola parameter, to match divergence differences in the two spatial axial directions. These usually result from the non-symmetrical form of focal spots of the X-ray radiation sources (rectangular, elliptical) which generally reach the imaging.

The focal point becomes a focal point range between meridional and sagittal focal points.

If the thermal focal spot is put into the focal point range by means of the differently curved reflective elements, that proportion of the area of the thermal focal spot which actually contributes to the imaging increases. Temporal fluctuations in the photon flux, resulting from local differences in brilliance on the thermal focal spot and the drifting thereof on the anode surface, can be virtually completely compensated for owing to the averaging of a larger area.

Non-symmetrical beam cross sections of the X-ray radiation emitted by X-ray beam sources can be shaped into symmetrical cross sections and also be imaged in this way at the sample location if use is made of different reflective elements in a targeted manner.

The improved homogeneity and symmetry of the beam cross section, its improved temporal stability and, at the same time, the optimum intensity in the imaged focal spot on the sample are advantageous.

The realization of an "astigmatic" imaging which may be at least approximately symmetrical is realized by means of two different gradient multilayers in a side-by-side arrangement of two reflective elements.

The distances between the source-side focal point and the centre of the two reflective elements differ in both reflective elements according to the sagittal or meridional focal point distance chosen. The distance between the centre of the two reflective elements and the focal point at the location of a sample being identical or being able to be identical especially in the case of the focussing arrangement.

Even if the ellipse parameters a and b of the two reflective elements differ, it is nevertheless possible to comply with the symmetry of the convergence angle in the two axial directions perpendicular to the beam direction at the sample location.

In the case of a collimating embodiment of X-ray optical elements, it is possible to achieve a symmetrical (square or circular) beam cross section by means of a suitable choice of the two parabola parameters p of the two reflective elements.

The distances between focal points considered from the direction of the X-ray beam source and the centre of the reflective elements differ with regard to the meridional and sagittal focal point distances in both reflective elements in a preferred embodiment. When focussing in the direction of a sample, the distance of the focal points from the centre of the reflective elements to the sample location should be identical.

The reflective elements are preferably provided with a gradient multilayer system at their surfaces, in which system the different thicknesses of individual layers are derived from the respectively locally different angles of incidence and the respective wavelength of the X-ray radiator.

The Bragg condition $\lambda=2d_{eff}*\sin\theta$ ought to be taken into account in order to achieve an increased reflectivity.

Besides graded layer thickness distributions in a lateral direction, layer thickness distributions that are graded in their depth can also be realized at multilayer systems.

Moreover, in contrast to the known solutions, the invention may advantageously be embodied such that the two reflective elements are oriented at an angle of less than 90° with respect to one another. An overlapping region of the X-ray radiation with increased intensity can thereby be achieved in the reflected imaging. In this case, the angular inclination may be chosen to be only slightly less than 90°.

The text below will have recourse to figures for an exemplary elucidation.

In the figures:

FIG. 1 shows a first examplary embodiment of an X-ray optical elements according to the present invention, FIG. 2 show curvatures of a first set of reflective curved elements of the optical element of FIG. 1, FIG. 3 shows a second examplary embodiment of an X-ray optical element according to the present invention, and FIG. 4 shows curvature of a second set of reflective curved elements of the optical element of FIG. 3.

It becomes clear in this case that with an X-ray optical element according to the invention, the two focal points are arranged in the direction of the X-ray radiation reflected onto a sample within a focal point volume and, therefore, the two reflective elements have different focal lengths.

The invention claimed is:

1. An X-ray optical element for reflection of a cross-sectionally reflected X-ray radiation in two dimensions, comprising:
   a first reflective, curved surface;
   a second reflective, curved surface adjacent to the first element at a joint angle; and
   an X-ray beam source producing the X-ray radiation directed onto the first and second reflective surfaces, the X-ray radiation being reflected from one of the first and second surfaces onto the other surface, the first surface curved at a first angle different than a second angle at which the second surface is curved, the first surface exhibiting a first focal length different than a second focal length that the second surface exhibits.

2. The X-ray optical element according to claim 1, wherein the joint angle is 90°.

3. The X-ray optical element according to claim 1, wherein the joint angle is less than 90°.

4. The X-ray optical element according to claim 1, wherein the first and second reflective surfaces are curved one of parabolically, elliptically, and a combination thereof.

5. The X-ray optical element according to claim 1, wherein the first and second reflective surfaces are formed with multilayer systems having graded layer thicknesses.

6. The X-ray optical element according claim 5, wherein the layer depths of one of the multilayer systems is graded.

7. The X-ray optical element according to claim 1, wherein the X-ray radiation is directed and reflected onto the first and second surfaces in compliance with a Bragg condition.

8. The X-ray optical element according to claim 1, wherein the first and second focal lengths have respective focal points are arranged within a focal point volume.

9. The X-ray optical element according to claim 1, wherein the X-ray beam source is located prior to the first and second reflective surfaces so that the X-ray radiation forms a tetraeder.

10. A method for at least one of local and temporal influencing of at least one of a homogeneity, an energy/photon density over a cross section, a form of the cross section, an area of the cross section, a divergence for an X-ray radiation, comprising:
   directing the X-ray radiation to a first and second reflective, curved surfaces, the first and second surfaces adjacent to one another at a joint angle; and
   reflecting the X-ray radiation from one of the first and second surfaces onto the other surface, the first surface curved at a first angle different than a second angle at which the second surface is curved, the first surface exhibiting a first focal length different than a second focal length that the second surface exhibits.

* * * * *